D. CRAIG.
MEANS FOR SECURING BOLTS IN BODIES OF HARDENED PLASTIC MATERIAL.
APPLICATION FILED MAR. 11, 1909.
977,710.
Patented Dec. 6, 1910.
2 SHEETS—SHEET 1.
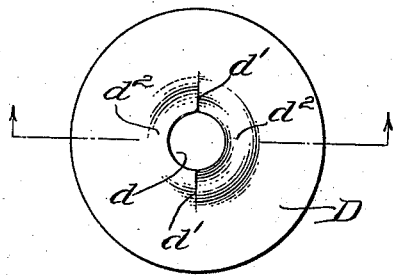
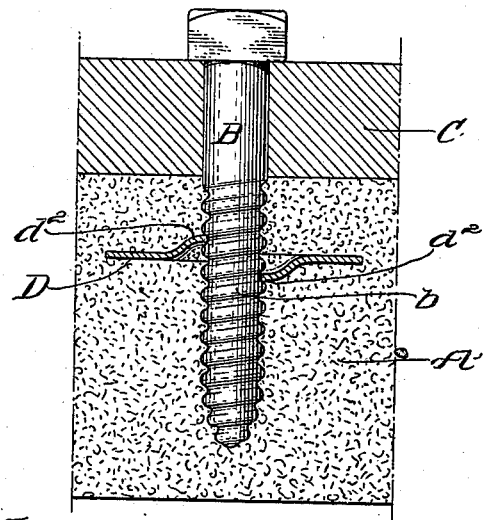
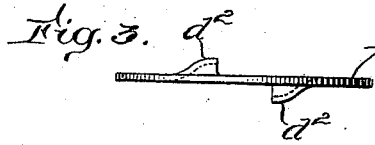
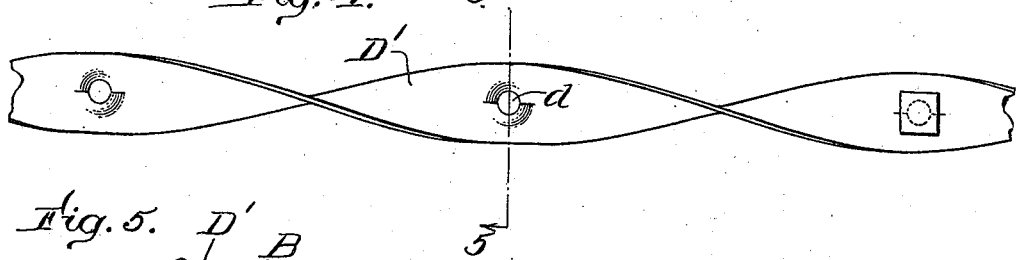
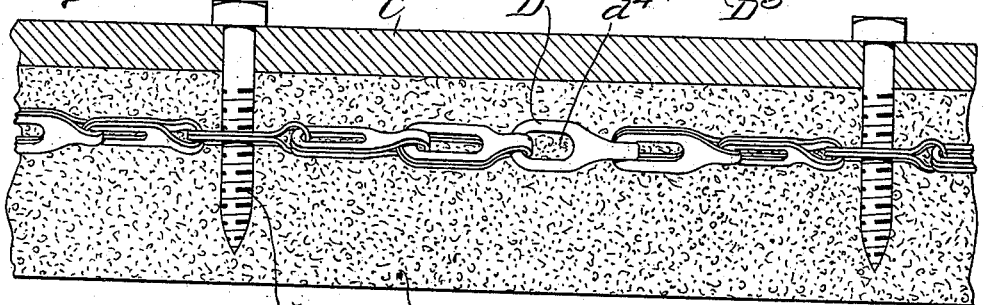
Witnesses:
Inventor: David Craig,
by Roberts, Roberts & Cushman,
Attorneys.

D. CRAIG.
MEANS FOR SECURING BOLTS IN BODIES OF HARDENED PLASTIC MATERIAL.
APPLICATION FILED MAR. 11, 1909.

977,710.

Patented Dec. 6, 1910.

2 SHEETS—SHEET 2.

Witnesses:
Josephine H. Ryan
Charles J. Woodberry

Inventor:
David Craig
by Roberts, Roberts & Cushman
Attorney

UNITED STATES PATENT OFFICE.

DAVID CRAIG, OF MELROSE, MASSACHUSETTS, ASSIGNOR TO THE DAVID CRAIG COMPANY, A CORPORATION OF MAINE.

MEANS FOR SECURING BOLTS IN BODIES OF HARDENED PLASTIC MATERIAL.

977,710. Specification of Letters Patent. Patented Dec. 6, 1910.

Application filed March 11, 1909. Serial No. 482,857.

*To all whom it may concern:*

Be it known that I, DAVID CRAIG, a citizen of the United States, and resident of Melrose, in the county of Middlesex and State of Massachusetts, have invented new and useful Improvements in Means for Securing Bolts in Bodies of Hardened Plastic Material, of which the following is a specification.

This invention relates to means for securing bolts in bodies of hardened plastic material, such as concrete structures, and consists in the improved devices hereinafter more particularly described and specifically pointed out in the claims.

Figure 6:
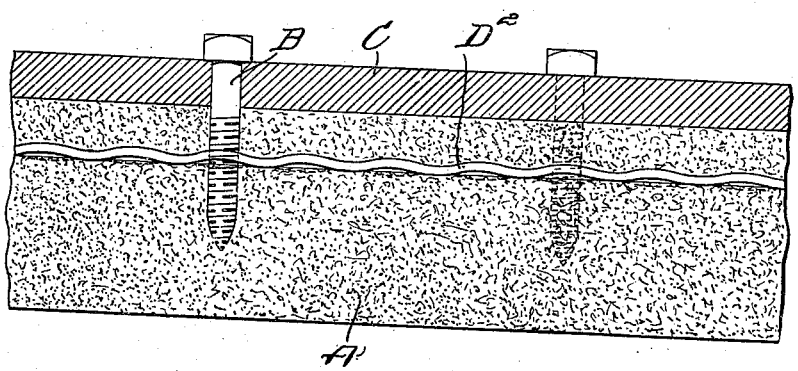
Figure 7:
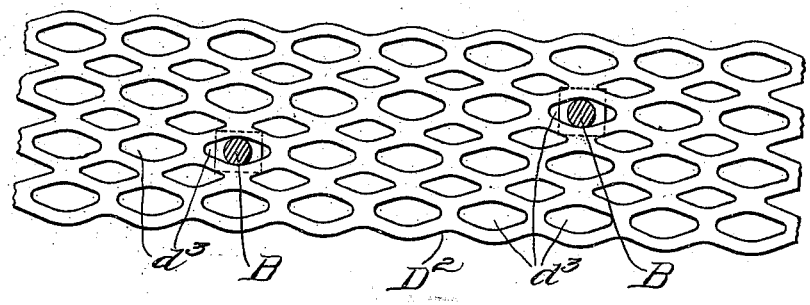

In the accompanying drawings which illustrate certain embodiments of the invention,—Figure 1 is a sectional view, partly in elevation, of a body of concrete or other hardened plastic material, showing the bolt secured therein by one form of anchoring means; Fig. 2 is a plan view of the anchoring means shown in Fig. 1; Fig. 3 is a side view of said anchoring means; Fig. 4 is a plan view of a modified form of anchoring means; Fig. 5 is a sectional view on line 5—5 of Fig. 4; Fig. 6 is a sectional view, partly in elevation, of a body of concrete or the like wherein the bolt is held by still another form of anchoring means; Fig. 7 is a plan view of the anchoring means shown in Fig. 6; Fig. 8 is a sectional view, partly in elevation, of a body of concrete or the like showing the bolts held therein by another form of anchoring means; and Fig. 9 is a detail view in plan of the anchoring means shown in Fig. 8.

Referring to the drawings, A represents a mass of concrete or other hardened plastic material in which it is desired to secure a bolt. The bolt is shown at B and as herein illustrated is shown as utilized for fastening a slab C to the concrete mass A. The bolt B is provided with projections or ribs to engage the various forms of anchoring means hereinafter described, embedded in the concrete, which projections or ribs are preferably in the form of a screw thread $b$.

In Figs. 1 to 3 inclusive the anchoring means consists of the disk-like plate D having a central perforation $d$. The plate D is slit as shown at $d'$ at opposite sides of the perforation $d$, thus forming two opposed lips $d^2$, which are oppositely bent out of the plane of the disk D, as best shown in Figs. 1 and 3, forming offset engaging edges for the screw thread $b$ of the bolt.

Referring to Figs. 4 and 5, the anchoring means is shown as consisting of an elongated plate or strip of sheet metal D' provided with a series of perforations $d$, the plate being slit adjacent to said perforations and bent to form bolt engaging lips precisely as in the construction shown in Figs. 1 to 3 inclusive. The strip D' is preferably twisted as shown to form a more effective reinforcement when embedded in the concrete.

In Figs. 6 and 7 the anchoring means consists of an elongated strip of sheet metal $D^2$ provided with a large number of apertures or perforations $d^3$ arranged close together so as to afford great latitude in the arrangement of the bolts B to be secured in the concrete material. The opposed edges of the aperture $d^3$ are bent and offset from each other as best shown in Fig. 6 to engage the thread of bolt B.

In Figs. 8 and 9 the bolt anchoring means consists of a chain $D^3$ the links of which are flat as shown, and are preferably made of sheet metal, and the flattened portions provided with apertures $d^4$ of such diameter as to receive the shank of bolt B and to engage the projection or thread $b$. It will also be noticed that the chain constituting this form of anchoring strip is twisted similarly to the strip shown in Figs. 4 and 5; and that the chain strip, being flexible, may readily be made to assume any desired shape within the concrete mass A, or to follow any bend or irregular conformation of the wall or body A.

In the form shown in Figs. 1 to 3 inclusive the anchoring means is designed to secure one bolt, while in the other forms the elongated anchoring means will not only secure a series or plurality of bolts, but will also serve as a reinforcement for the concrete in which it is embedded.

I claim:

1. In combination with a mass of hardened plastic material, an anchor for a bolt comprising a sheet of metal having a perforation therethrough, the opposed edges of said perforation being oppositely bent to form offset screw engaging means, and a screw threaded bolt extending into said material and passing through said perforation, the thread of said bolt engaging the offset edges of said perforation.

2. In combination with a mass of hardened plastic material, an anchor for a bolt comprising a sheet of metal having a perforation therethrough, said sheet being slit at opposite sides of the perforation to form two opposed lips, said lips being oppositely bent from the plane of said sheet, and a screw threaded bolt extending into said material and passing through said perforation, the thread of said bolt engaging said offset opposed lips.

3. In combination with a mass of hardened plastic material, an anchor consisting of an elongated strip of metal, wholly embedded within said mass, said strip being twisted and having a series of flattened parts made with perforations therethrough, and a plurality of bolts extending into said material and provided with screw threads or ribs which engage the edges of said perforations.

4. In combination with a mass of plastic material, an anchor consisting of an elongated metallic strip, wholly embedded within said mass, said strip being readily flexible, whereby it may be given any desired shape within said plastic mass before the same hardens, said strip being also provided with a series of perforations, and a plurality of bolts extending into said material and provided with screw threads or ribs which engage the edges of said perforations.

Signed by me at Boston, Massachusetts, this 4th day of March, 1909.

DAVID CRAIG.

Witnesses:
CHARLES D. WOODBERRY,
ROBERT CUSHMAN.